US012742991B2

(12) United States Patent
Wang

(10) Patent No.: US 12,742,991 B2
(45) Date of Patent: Sep. 22, 2026

(54) DIMMING DEVICE AND DIMMING APPARATUS

(71) Applicant: GUANGYI INTELLIGENT TECH (SUZHOU) CO., LTD., Jiangsu (CN)

(72) Inventor: Weishu Wang, Jiangsu (CN)

(73) Assignee: GUANGYI INTELLIGENT TECH (SUZHOU) CO., LTD., Jiangsu (CN)

( * ) Notice: Subject to any disclaimer, the term of this patent is extended or adjusted under 35 U.S.C. 154(b) by 199 days.

(21) Appl. No.: 18/841,153

(22) PCT Filed: Feb. 21, 2023

(86) PCT No.: PCT/CN2023/077293
§ 371 (c)(1),
(2) Date: Aug. 23, 2024

(87) PCT Pub. No.: WO2023/160511
PCT Pub. Date: Aug. 31, 2023

(65) Prior Publication Data

US 2025/0389996 A1 Dec. 25, 2025

(30) Foreign Application Priority Data

Feb. 24, 2022 (CN) ........................ 202210172753.5

(51) Int. Cl.
*G02F 1/153* (2006.01)
*B60J 3/04* (2006.01)
*G02F 1/155* (2006.01)

(52) U.S. Cl.
CPC .............. *G02F 1/1533* (2013.01); *B60J 3/04* (2013.01); *G02F 1/155* (2013.01)

(58) Field of Classification Search
CPC ........ G02F 1/1533; G02F 1/155; G02F 1/153; B60J 3/04
See application file for complete search history.

(56) References Cited

U.S. PATENT DOCUMENTS

2019/0004387 A1 1/2019 Ash et al.
2022/0379584 A1* 12/2022 Ogawa .............. B32B 17/10788

FOREIGN PATENT DOCUMENTS

CN 109116653 A 1/2019
CN 208914942 U 5/2019
CN 111409330 A 7/2020
(Continued)

OTHER PUBLICATIONS

Extended European search for EP Application 23759136.7, prepared by the European Patent Office, dated Jan. 1, 2026, 7 pages.

*Primary Examiner* — James C. Jones
(74) *Attorney, Agent, or Firm* — Brooks Kushman P.C.

(57) ABSTRACT

A dimming device and a dimming apparatus. The dimming device includes a dimming film. The dimming film includes a first area and a second area, and the second area is arranged surrounding a circumference of the first area. The dimming film includes a preset point O and a preset division line M, where the preset division line M divides the dimming film into a first part and a second part, and the preset point O is located on the preset division line M. The first part satisfies an inequality of $A_1A_2 \leq OB_1 - L_1$, and the second part satisfies an inequality of $C_1C_2 \leq OD_1 - L_2$.

20 Claims, 7 Drawing Sheets

(56) References Cited

FOREIGN PATENT DOCUMENTS

| | | | |
|---|---|---|---|
| CN | 213814207 | U | 7/2021 |
| CN | 113748369 | A | 12/2021 |
| CN | 113759626 | B | 11/2022 |
| CN | 113165973 | B | 6/2023 |
| EP | 2322984 | A1 | 5/2011 |
| EP | 3926391 | A1 | 12/2021 |
| JP | 2008087702 | A | 4/2008 |

* cited by examiner

DIMMING DEVICE AND DIMMING APPARATUS

CROSS-REFERENCE TO RELATED APPLICATIONS

This application is the national phase entry of International Application No. PCT/CN2023/077293 with an international filing date of Feb. 21, 2023, designating the United States, now pending, and claims for priority of Chinese Patent Application No. 202210172753.5 filed on Feb. 24, 2022. The entire contents of the aforementioned applications, including any intervening amendments thereto, are incorporated herein by reference.

TECHNICAL FIELD

The present application relates to the field of flexible dimming device technology, and in particular, to a dimming device and a dimming apparatus.

BACKGROUND

In recent years, with the continuous development of electric vehicle technology, electrochromic devices have been increasingly used in glass sunroofs of electric vehicles. In particular, electrochromic devices with flexible substrates can greatly reduce the manufacturing cost for curved color-changing glasses due to their good performance at fitting onto curved surfaces, and thus have good market prospects.

In existing technologies, since the color-changing sunroof glass has a certain curvature, obvious wrinkles will appear on some edges of a flexible electrochromic device when the flexible electrochromic device is laid on a curved glass with a large curvature. This affects the performance of the flexible electrochromic device, causing problems such as a failure of color-changing function at the corresponding position of the flexible electrochromic device. As time goes by, the failure area will be continuously enlarged, meanwhile, the appearance of the color-changing sunroof glass will also be affected, which will then affect the user experience.

SUMMARY

The present application provides a dimming device and a dimming apparatus, which can alleviate the problem of edge wrinkles.

In accordance with a first aspect of the present application, a dimming device is provided, which includes a dimming film, the dimming film includes a first area and a second area, and the second area is arranged surrounding a circumference of the first area.

The dimming film includes a preset point O and a preset division line M. The preset division line M divides the dimming film into a first part and a second part. The preset point O is located on the preset division line M.

The first part satisfies an inequality of $A_1A_2 \leq OB_1 - L_1$.

In the above inequality, $A_1$ represents a point on an outer contour of the second area that is farthest from the preset point O in the first part, $A_2$ represents an intersection point formed by a line segment $OA_1$ intersected with an outer contour of the first area, $B_1$ represents a point on the outer contour of the second area that is closest to the preset point O in the first part, and $L_1$ represents the maximum vertical distance between the outer contour of the first area and the preset division line M in the first part.

The second part satisfies an inequality of $C_1C_2 \leq OD_1 - L_2$.

In the above inequality, $C_1$ represents a point on the outer contour of the second area that is farthest from the preset point O in the second part, $C_2$ represents an intersection point formed by a line segment $OC_1$ intersected with the outer contour of the first area, $D_1$ represents a point on the outer contour of the second area that is closest to the preset point O in the second part, and $L_2$ represents the maximum vertical distance between the outer contour of the first area and the preset division line M in the second part.

In some embodiments, the outer contour of the first area includes a first contour portion, a second contour portion, a third contour portion and a fourth contour portion arranged sequentially around a quadrilateral circumference. The first contour portion and the third contour portion are provided on the first part and the second part respectively. The second contour portion and the fourth contour portion are both extended from the first part to the second part.

The outer contour of the second area includes a first contour line segment, a second contour line segment, a third contour line segment and a fourth contour line segment surrounding sequentially in a circumferential direction of the second area. the first contour line segment is opposite to the first contour portion, and the third contour line segment is opposite to the third contour portion.

In some embodiments, the first contour line segment is parallel to the first contour portion, and the third contour line segment is parallel to the third contour portion.

An arc contour line segment is provided between any two adjacent contour line segments among the first contour line segment, the second contour line segment, the third contour line segment and the fourth contour line segment.

In some embodiments, the first contour line segment is curved and convex in a direction away from the first contour portion, and the third contour line segment is curved and convex in a direction away from the third contour portion.

In some embodiments, any two adjacent contour line segments among the first contour line segment, the second contour line segment, the third contour line segment and the fourth contour line segment are directly connected with each other.

In some embodiments, any two adjacent contour line segments among the first contour line segment, the second contour line segment, the third contour line segment and the fourth contour line segment are connected with an arc contour line segment.

In some embodiments, the outer contour of the first area also includes a special-shaped contour portion, and the special-shaped contour portion is provided on the first contour portion, the second contour portion, the third contour portion or the fourth contour portion.

In some embodiments, the dimming device also includes a busbar assembly, the busbar assembly is arranged at a circumferential edge of the dimming film and are located at a side of the outer contour of the first area away from the preset point O.

The busbar assembly is arranged along at least a portion of a quadrilateral.

In some embodiments, the busbar assembly is arranged in one piece.

In some embodiments, the busbar assembly is arranged on a side of the second area away from the first area, and the busbar assembly includes a plurality of turning portions, and the plurality of turning portions are protruded with respect to the second area.

The dimming film also includes a plurality of hollow areas, each hollow area is arranged in correspondence with a turning portion, and the hollow areas are located on a side of the second area away from the first area, so that the first part satisfies the inequality of $A_1A_2 \leq OB_1-L_1$ and the second part satisfies the inequality of $C_1C_2 \leq OD_1-L_2$.

In some embodiments, each hollow area extends throughout an area between the second area and a corresponding turning portion.

In some embodiments, the hollow areas are filled with a support structure.

In accordance with a second aspect of the present application, a dimming apparatus is also provided which includes the dimming device aforesaid.

Beneficial effects of the present application are that: a dimming device and a dimming apparatus including the dimming device are provided. The dimming device includes a dimming film, the dimming film includes a first area and a second area surrounding the first area, and the dimming device includes a preset point O and a preset division line M. The preset division line M can divide the dimming film into a first part and a second part.

The first part satisfies the inequality of $A_1A_2 \leq OB_1-L_1$ and the second part satisfies the inequality of $C_1C_2 \leq OD_1-L_2$, thus, the distance between point $B_1$ and the preset point O tends to be equal to the distance between point $A_1$ and the preset point O, and the distance between point $D_1$ and the preset point O tends to be equal to the distance between point $C_1$ and preset point O. Thereby, when the dimming device is attached to a glass plate having a large curvature of the dimming apparatus, the stress that causes wrinkles on the edge of the dimming device can be dispersed, that is, the concentration of stress can be reduced, and the uniformly distributed stress can be offset by the tension of the dimming device, thereby avoid wrinkles formed near point $B_1$ and point $D_1$, and alleviate wrinkles formed on the edge of the dimming device. On one hand, dimming performance failure caused by wrinkles can be alleviated and the service life of dimming device and dimming apparatus can be prolonged. On the other hand, the appearance of the dimming apparatus and the user experience both can be improved.

BRIEF DESCRIPTION OF THE DRAWINGS

In order to illustrate the technical solutions of the embodiments in the present application more clearly, the drawings are briefly introduced as below. It should be understood that the following drawings merely show some examples of the present application and therefore should not be regarded as a limitation of the scope. For persons of ordinary skill in the art, other relevant drawings may be obtained based on these drawings without exerting creative efforts.

REFERENCE NUMERALS FOR MAIN ELEMENTS ARE LISTED AS FOLLOWS

Figure 1:
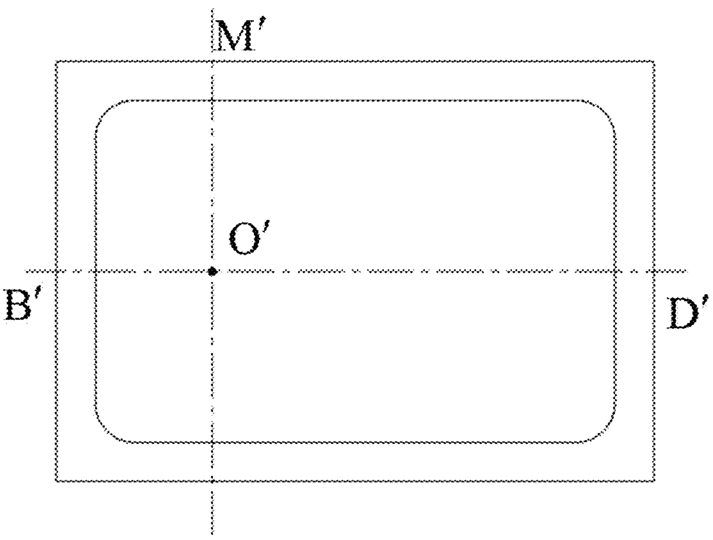
FIG. 1 shows a schematic structural diagram of a flexible electrochromic device of a prior color-changing sunroof glass.

100—dimming device; 10—dimming film; 10*a*—first part; 10*b*—second part; 11—first area; 111—first contour portion; 112—second contour portion; 113—third contour portion; 114—fourth contour portion; 115—arc contour portion; 116—special-shaped contour portion; 12—second area; 121—first contour line segment; 122—second contour line segment; 123—third contour line segment; 124—fourth contour line segment; 125—arc contour line segment; 13—hollow area; 20—busbar assembly; 21—first busbar; 22—second busbar; 23—third busbar; 24—fourth busbar; 201—turning portion; 202—electrode lead; 30—support structure; 110—color-changing material layer; 120—electrolyte layer; 130—ion storage layer; 141—first transparent substrate; 142—first conductive layer; 151—second transparent substrate; 152—second conductive layer; 210—first glass plate; 220—first adhesive layer; 230—shielding member; 310—second glass plate; 320—second adhesive layer; and 400—seal member.

DETAILED DESCRIPTION OF THE EMBODIMENTS

The embodiments of the present application are described in detail as below. Examples of the embodiments are shown in the drawings. In the drawings, the same reference or similar reference numerals throughout represent the same elements or similar elements or elements having the same functions or similar functions. The following embodiments described with reference to the drawings are illustrative and are only intended to interpret the present application, and thus should not be construed as limitations to the present application.

In the description of the present application, it should be understood that orientation or positional relationships indicated by terms “center”, “longitudinal”, “transverse”, “length”, “width”, “thickness”, “upper”, “lower”, “front”, “rear”, “left”, “right”, “vertical”, “horizontal”, “top”, “bottom”, “inside”, “outside”, “clockwise”, “counterclockwise”, “axial”, “radial”, “circumferential” etc., are based on the orientation or positional relationship shown in the drawings, which is used only for describing the present application and simplifying the description, and is not to indicate or imply the device or element referred to must have a specific orientation, be constructed and be operated in a specific orientation and therefore should not be construed as limitations to the present application.

In addition, the terms “first” and “second” are used for descriptive purposes only and should not be understood as indicating or implying relative importance or implicitly indicating the quantity of indicated technical features. Therefore, features defined as "first" and "second" may explicitly or implicitly include one or more of these features. In the description of the present application, the phrase "a/the plurality of" means two or more than two, unless otherwise explicitly and specifically limited.

In the present application, unless otherwise expressly specified and limited, the terms "installation", "connection", "connection", "fixing" and other terms should be understood in a broad scope. For example, term "connection" may be a fixed connection or a detachable connection, or may be integrally formed or may be a mechanical connection or an electrical connection, or may be a direct connection or an indirect connection with an intermediate medium. It may be an internal communication between two elements or an interaction between two elements. For persons of ordinary skill in the art, the specific meanings of the above terms in the present application should be understood according to specific circumstances.

In the present application, unless otherwise expressly specified and limited, a first feature being "on" or "below" a second feature may mean that the first and second features are in direct contact, or the first and second features are indirectly connected through an intermediate medium. Furthermore, the first feature being "on", "above" and "over" the second feature may mean that the first feature is directly above or diagonally above the second feature, or simply means that the first feature has a higher horizontal height than the second feature. The first feature being "under", "below" and "beneath" the second feature may mean that the first feature is directly below or diagonally below the second feature, or simply means that the first feature has a lower horizontal height than the second feature.

It can be understood that the color-changing sunroof glass in electric vehicles is usually curved and has a highest point with respect to the horizontal direction. Meanwhile, the color-changing sunroof glass includes a division line passing through the highest point, and the division line extends substantially along the width direction of the electric vehicle. Any point on the division line is the highest point along the length direction of the electric vehicle body.

As shown in FIG. 1, which is a schematic structural diagram of a flexible electrochromic device of a prior color-changing sunroof glass. In the figure, the flexible electrochromic device includes a visual area and a shielding area located outside the visual area. Herein, the point O' is a projection point of the highest point of the color-changing sunroof glass on the flexible electrochromic device. The straight line M' is a projection straight line of the division line on the flexible electrochromic device. The point B' is on one side of the straight line M', located at the edge of the flexible electrochromic device, and is the point closest to the point O'. The point D' is at the edge of the flexible electrochromic device, and is the point closest to the point O', where point D' is on the other side of the straight line M'. When the flexible electrochromic device is attached to the curved surface of the color-changing sunroof glass, the flexible electrochromic device will have obvious wrinkles at the edges, especially near the point B' and points D'. This affects the performance of the corresponding position of the flexible electrochromic device, causing film layer separation and other problems in the flexible electrochromic device, resulting in a failure of color-changing function. As time goes by, the failure area of the flexible electrochromic device will continue to expand, affecting the normal use of the color-changing sunroof glass. In addition, the existence of wrinkles will also affect the appearance of the color-changing sunroof glass and affect the user experience.

Figure 2:
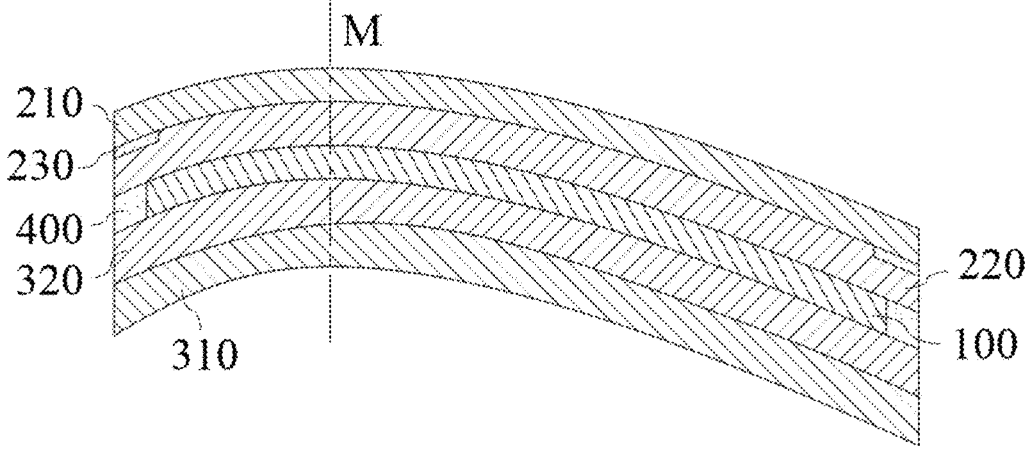
FIG. 2 shows a partial cross-sectional view of a schematic structural diagram of a dimming apparatus in some embodiments.

As shown in FIG. 2, an embodiment provides a dimming apparatus, which can significantly alleviate the edge wrinkles.

In some embodiments, the dimming apparatus may be a sunroof glass having a dimming function in electric vehicles, fuel vehicles, hybrid vehicles, and other vehicles.

In other embodiments, the dimming apparatus may also be a structure such as window glass having a dimming function in residential buildings, shopping malls, factories, laboratories and other places.

Accordingly, in the embodiments, the dimming apparatus may be of a curved surface, and the dimming apparatus may include a highest point with respect to the horizontal plane as well as a division line passing through the highest point.

As shown in FIG. 2, the dimming apparatus may include a first glass plate 210, a dimming device 100 and a second glass plate 310 that are laminated in sequence, where the first glass plate 210 and the dimming device 100 may be bonded through a first adhesive layer 220, and the second glass plate 310 and the dimming device 100 may be bonded through a second adhesive layer 320. It can be understood that a seal member 400 of a ring shape may be provided surrounding a circumferential edge of the dimming device 100 to provide moisture isolation. The seal member 400 may be located between the first adhesive layer 220 and the second adhesive layer 320. The first glass plate 210, the dimming device 100 and the second glass plate 310 in the dimming apparatus may all in a curved shape.

In some embodiments, both the first adhesive layer 220 and the second adhesive layer 320 are optically transparent adhesive materials. For example, the first adhesive layer 220 and the second adhesive layer 320 may be made of one or more adhesive materials selected from an optically clear adhesive (OCA), a solid optically clear adhesives (SCA), an ionic interlayer film (Super Safe Glass, SGP), a liquid optically clear adhesive (LOCA), polyvinyl butyral (PVB), etc.

The seal member 400 may be made of glue capable of insulating and isolating water and oxygen. For example, the glue may be at least selected from one of pressure-sensitive adhesives, hot melt adhesives, UV-curable adhesives, heat-curable adhesives or UV-heated dual-cure adhesives. The seal member 400 may also be made of one or more adhesive materials such as the optical clear adhesive, the solid optical clear adhesive, the ionic interlayer film, the liquid optical clear adhesive, etc. That is, the seal member 400 may be made of the same material as the two adhesive layers.

In some embodiments, a shielding member 230 is provided on a side of the first glass plate 210 close to the dimming device 100, and the shielding member 230 may be provided surrounding and being close to the circumferential edge of the first glass plate 210. The shielding member 230 may partially shield the circumferential edge of the dimming device 100, so that the dimming device 100 presents a visual area and a shielding area circumferentially surrounding the visual area.

It can be understood that the dimming device 100 may be in a flat plate shape when the dimming device 100 is not assembled between two glass plates. FIGS. 3 to 14 are corresponding structural schematic diagrams when the dimming device 100 is not installed between two glass plates.

Figure 3:
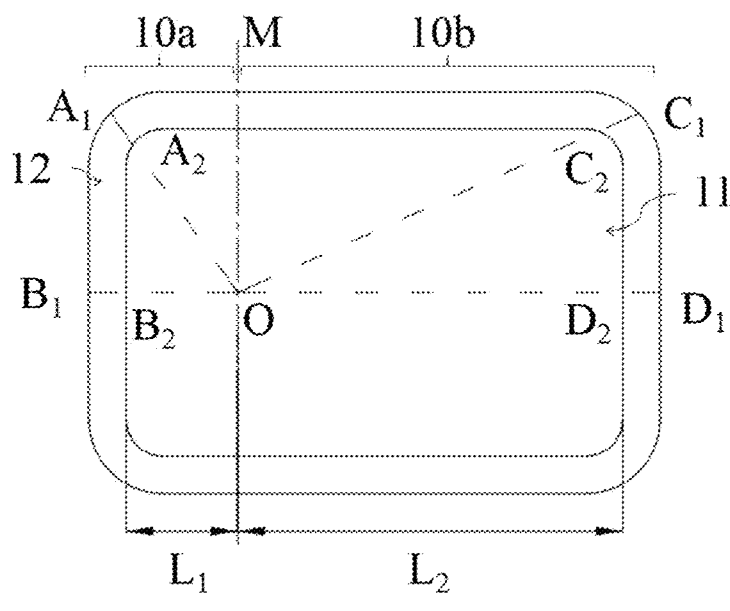
FIG. 3 shows a top view of a schematic structural diagram of a dimming film in some embodiments.
Figure 4:
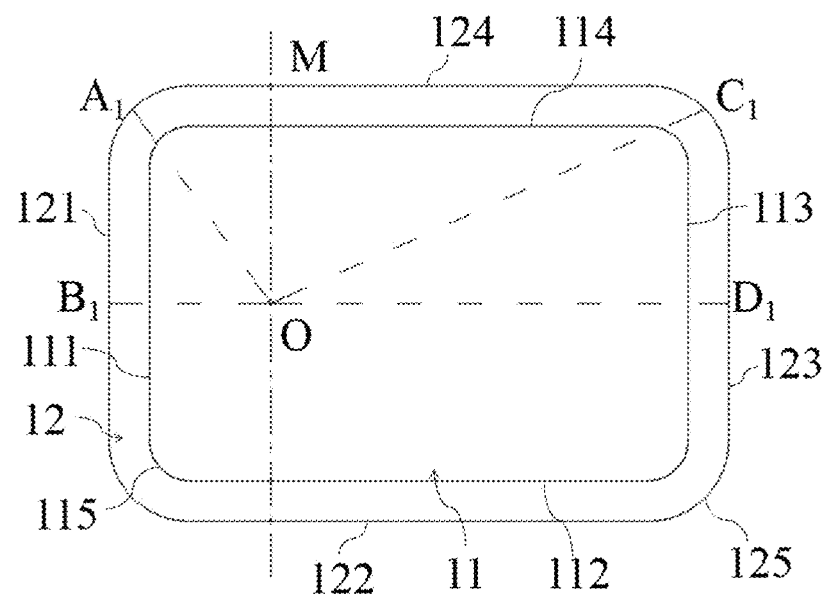
FIG. 4 shows atop view of a schematic structural diagram of the dimming film in one embodiment.

As shown in FIG. 3 and FIG. 4, in some embodiments, the dimming device 100 may include a dimming film 10, and the dimming film 10 may be in a plate shape. In the embodiments, the dimming film 10 may include a first area 11 and a second area 12, and the second area 12 is arranged surrounding a circumference of the first area 11. The first area 11 may correspond to the visual area of the dimming device 100, and correspondingly, the second area 12 may correspond to the shielding area of the dimming device 100.

In the embodiments, the dimming film 10 also includes a preset point O and a preset division line M. The preset point O may be a projection point of the highest point of the dimming apparatus on the dimming film 10. The preset division line M may be a straight line where the division line of the dimming apparatus is projected on the dimming film 10. It can be understood that the preset point O is located on the preset division line M. Correspondingly, the preset division line M may divide the dimming film 10 into a first part 10*a* and a second part 10*b*.

In some embodiments, the first part 10*a* satisfies an inequality of $A_1A_2 \leq OB_1 - L_1$.

Herein, $A_1$ represents a point on an outer contour of the second area 12 that is farthest from the preset point O in the first part 10*a*; $A_2$ represents an intersection point of a line segment $OA_1$ and an outer contour of the first area 11; $B_1$ represents a point on the outer contour of the second area 12 that is closest to the preset point O in the first part 10*a*; and $L_1$ represents the maximum vertical distance between the outer contour of the first area 11 and the preset division line M in the first part 10*a*. In some embodiments, a line segment $OB_1$ and the outer contour of the first area 11 have an intersection point which is indicated by $B_2$, and $L_1$ may be equal to the length of the line segment $B_1B_2$.

Correspondingly, the second part 10*b* satisfies an inequality of $C_1C_2 \leq OD_1 - L_2$.

Herein, $C_1$ represents a point on the outer contour of the second area 12 that is farthest from the preset point O in the second part 10*b*; $C_2$ represents an intersection point of a line segment $OC_1$ and the outer contour of the first area 11; $D_1$ represents a point on the outer contour of the second area 12 that is closest to the preset point O in the second part 10*b*; and $L_2$ represents the maximum vertical distance between the outer contour of the first area 11 and the preset division line M in the second part 10*b*. In some embodiments, a line segment $OD_1$ and the outer contour of the first area 11 have an intersection point which is indicated by $D_2$, and $L_2$ may be equal to the length of the line segment $D_1D_2$.

It can be understood that in the dimming apparatus, the area and shape of the first area 11 are usually unchanged to adapt to the installation needs in structures such as vehicles.

In the embodiments, on two sides of the preset division line M, the inequalities of $A_1A_2 \leq OB_1 - L_1$ and $C_1C_2 \leq OD_1 - L_2$ are respectively satisfied. Therefore, the length of line segment $OB_1$ and the length of line segment $OA_1$ may be arranged to be equal, and the length of line segment $OD_1$ and the length of line segment $OC_1$ may be arranged to be equal, and then it is enabled that point $B_1$ and point $A_1$ tend to lie on the same arc, and point $D_1$ and point $C_1$ tend to lie on the same arc.

Furthermore, when the dimming device 100 is attached between two glass plates, the stress that causes wrinkles on the edge of the dimming film 10 tends to be uniformly distributed instead of being concentrated near points $B_1$ and $D_1$, thereby the concentration of stress can be reduced. In addition, uniformly distributed stresses can be offset by the tension of the dimming film 10 itself. As such, the occurrence of wrinkles at the edges of the dimming film 10 is eliminated, thereby wrinkles on the edges of the dimming device 100 can be alleviated. On one hand, the dimming performance failure caused by wrinkles can be alleviated and the service life of the dimming apparatus can be prolonged. On the other hand, the appearance of the dimming apparatus and the user experience can both be improved.

As shown in FIGS. 3 and 4, in some embodiments, the first area 11 may be substantially rectangular. Correspondingly, the outer contour of the first area 11 may include a first contour portion 111, a second contour portion 112, a third contour portion 113 and a fourth contour portion 114 arranged sequentially around a quadrilateral circumference. In the embodiments, the first contour portion 111, the second contour portion 112, the third contour portion 113 and the fourth contour portion 114 may all be straight line segments.

In some embodiments, the first contour portion 111 may be located in the first part 10*a* and the third contour portion 113 may be located in the second part 10*b*. The second contour portion 112 and the fourth contour portion 114 may both extend from the first part 10*a* to the second part 10*b*. In the embodiments, the outer contour of the first area 11 may also include four arc contour portions 115. Correspondingly, any two adjacent contour portions among the first contour portion 111, the second contour portion 112, the third contour portion 113 and the fourth contour portion 114 may be connected by one arc contour portion 115. In the embodiments, the arc contour portion 115 may protrude in a direction away from the preset point O.

In other embodiments, the first area 11 may also be square. Any two adjacent outline portions among the first contour portion 111, the second contour portion 112, the third contour portion 113 and the fourth contour portion 114 may also be directly interconnected.

As shown in FIGS. 3 and 4, in some embodiments, the outer contour of the second area 12 may include a first contour line segment 121, a second contour line segment 122, a third contour line segment 123 and a fourth contour line segment 124. Herein, the first contour line segment 121 may be parallel to and opposite to the first contour portion 111, the second contour line segment 122 may be parallel to and opposite to the second contour portion 112, and the third contour line segment 123 may be parallel to and opposite to the third contour portion 113, The fourth contour line segment 124 may be parallel to and opposite to the fourth contour portion 114. That is, in some embodiments, the first contour line segment 121, the second contour line segment 122, the third contour line segment 123 and the fourth contour line segment 124 are all presented as straight-line segments.

In some embodiments, the outer contour of the second area 12 also includes four arc contour line segments 125. An arc contour line segment 125 is provided between any two adjacent contour line segments among the first contour line segment 121, the second contour line segment 122, the third contour line segment 123 and the fourth contour line segment 124. Thereby, the wrinkles on the edges of the dimming apparatus can be alleviated. In this embodiment, the arc contour line segment 125 may be arranged protruding in a direction away from the preset point O.

Figure 5:
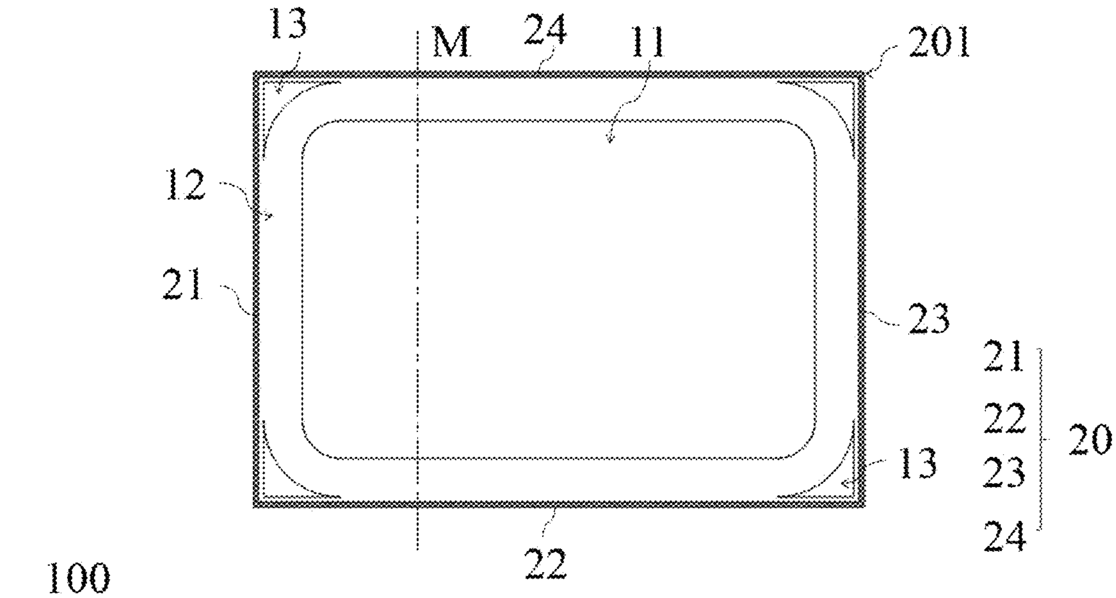
FIG. 5 shows atop view of a schematic structural diagram of a dimming device in some embodiments.
Figure 6:
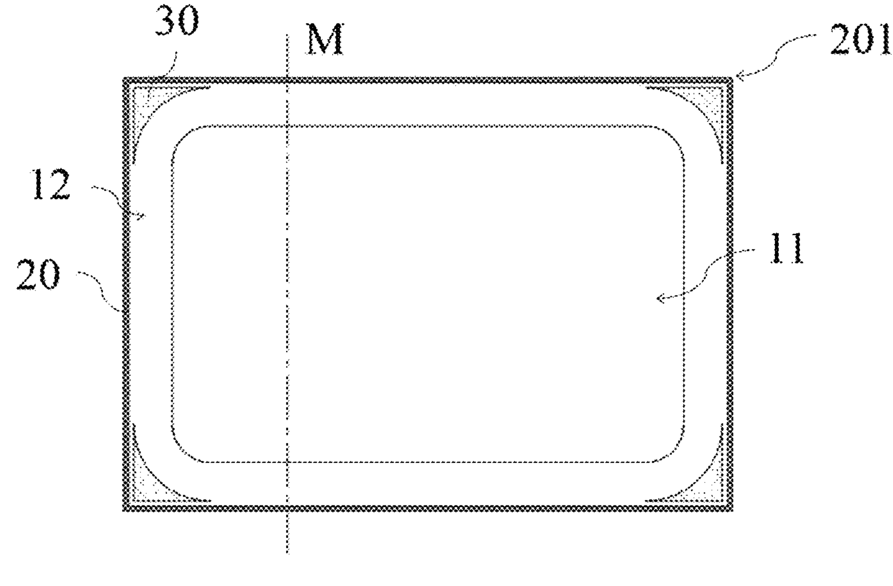
FIG. 6 shows a top view of a schematic structural diagram of the dimming device in some embodiments.

As shown in FIGS. 5 and 6, further, in some embodiments, the dimming device 100 may be an electrochromic device. Under the work of external electric field and current, the corresponding materials in the electrochromic device may undergo reversible oxidation-reduction reactions, which causes the material structure to change, and then enables the absorption spectrum and optical properties (such as absorptivity, transmittance and reflectivity, etc.) of the electrochromic device to be changed to achieve the function of light dimming, thus the appearance of the dimming device 100 is presented as a reversible change in color and transparency.

In other embodiments, the dimming device 100 may also utilize a panel structure having a dimming function such as photochromic, thermochromic, gaschromic, or liquid crystal panel.

In the embodiments, the dimming device 100 also includes a busbar assembly 20, which enable a power supply to the dimming film 10.

Figure 7:
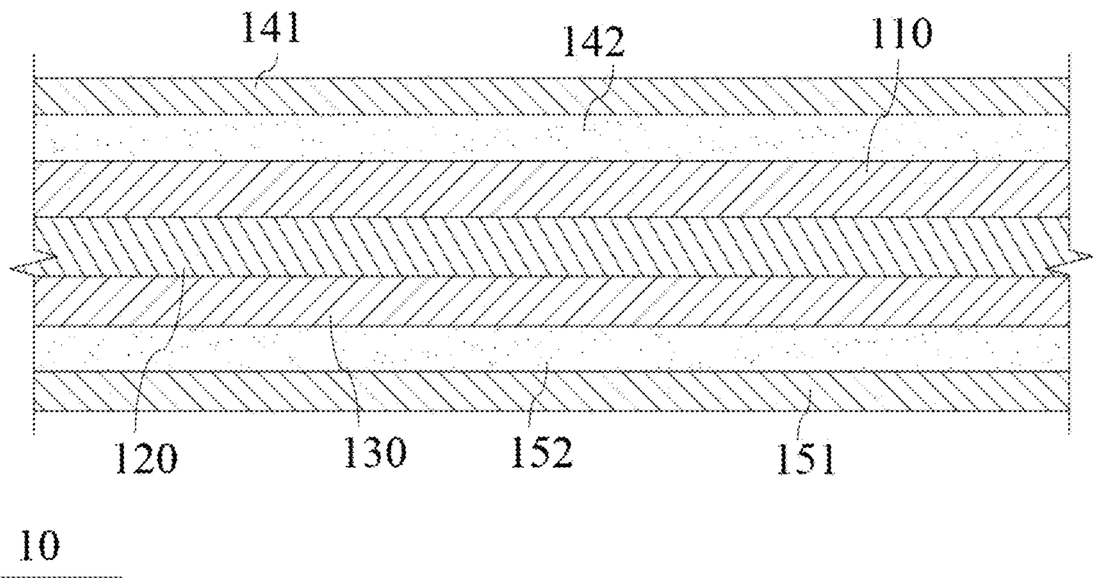
FIG. 7 shows a partial cross-sectional view of a schematic structural diagram of the dimming film in some embodiments.

In conjunction with FIG. 7, in some embodiments, the dimming film 10 includes a first transparent substrate 141, a first conductive layer 142, a color-changing material layer 110, an electrolyte layer 120, an ion storage layer 130, a second transparent substrate 151 and a second conductive layer 152 that are laminated in sequence. Herein, both the first conductive layer 142 and the second conductive layer 152 may be electrically connected to the busbar assembly 20. That is, the dimming device 100 includes two busbar assemblies 20, which are respectively used as the positive and negative electrodes of the dimming device 100.

In the embodiments, the first transparent substrate 141 and the second transparent substrate 151 may both be flexible. In some embodiments, both the first transparent substrate 141 and the second transparent substrate 151 may be made of one or more of polyethylene terephthalate (PET), cyclic olefin copolymer, cellulose triacetate, glass, and metal.

Both the first conductive layer 142 and the second conductive layer 152 may be made of one or more materials such as Indium-Tin Oxide (ITO), Aluminum Zinc Oxide (AZO), Fluorine Doped tin Oxide (FTO), silver nanowires, graphene, carbon nanotubes, metal meshes or silver nanoparticles.

The color-changing material layer 110 may be a gel electrochromic structure, or a single-layer or multi-layer all-solid electrochromic structure. The electrolyte layer 120 and the ion storage layer 130 may both be made of materials that have been disclosed in prior arts.

Figure 8:
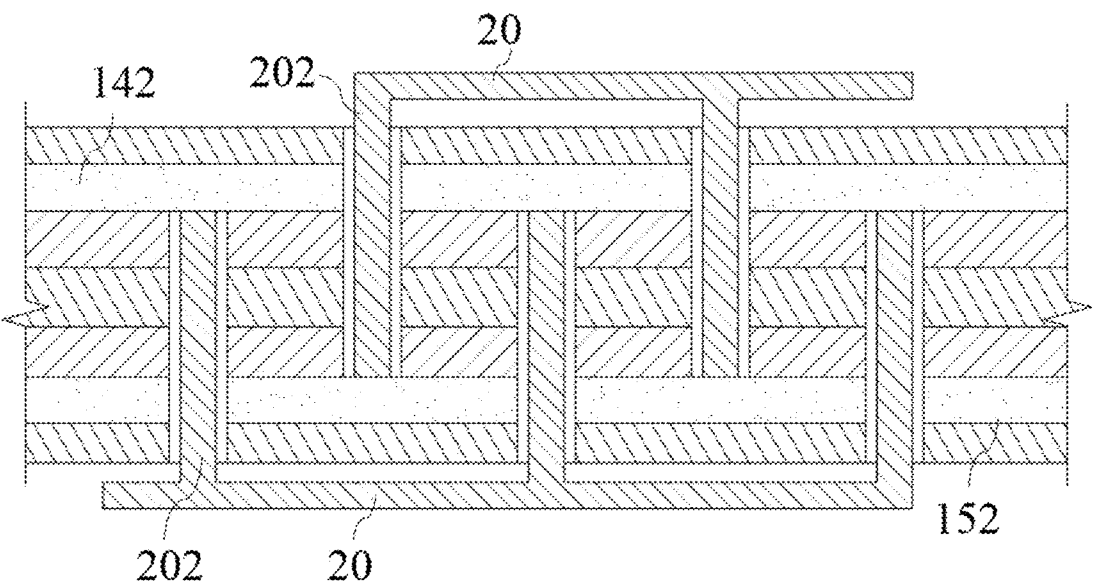
FIG. 8 shows a partial cross-sectional view of a schematic structural diagram of the dimming device in some embodiments.

As shown in FIG. 8, the busbar assembly 20 may be connected to the corresponding conductive layer with an electrode lead 202. In some embodiments, a cavity communicated with the conductive layer is provided on the dimming film 10, and the electrode lead 202 may be arranged passing through the cavity to be electrically connected to the corresponding conductive layer.

In some embodiments, the two busbar assemblies 20 may be configured to be the same. Detailed description will be given taking one set as an example.

As shown in FIG. 5, the busbar assembly 20 may include a first busbar 21, a second busbar 22, a third busbar 23 and a fourth busbar 24. In some embodiments, the first busbar 21, the second busbar 22, the third busbar 23 and the fourth busbar 24 may be continuously arranged along four sides of a rectangle, and each busbar is electrically connected to each other. Therefore, the busbar assembly 20 may be connected through a lead-out electrode for connection to a power supply or the like. Correspondingly, a right-angled turning portion 201 may be formed at a junction of any two adjacent busbars. In some embodiments, the busbar assembly 20 may be provided in one piece, and two adjacent busbars may be obtained by bending to facilitate a layout of the busbar assembly 20. In the embodiments, the busbar assembly 20 may be made of copper foil, silver wire, etc., provided with an adhesive layer.

In other embodiments, the four busbars may also be arranged separately, and the mechanical connection and electrical connection between two adjacent busbars may be achieved by welding or other methods.

In conjunction with FIGS. 4 and 5, in some embodiments, the busbar assembly 20 may be arranged at the circumferential edge of the dimming film 10. The first busbar 21 may be arranged at a position where the first contour line segment 121 is located, the second busbar 22 may be arranged at a position where the second contour line segment 122 is located, the third busbar 23 may be arranged at a position where the third contour line segment 123 is located, and the fourth busbar 24 may be arranged at a position where the fourth contour line segment 124 is located. At the same time, ends of each busbar are protruding with respect to the contour line segment where the busbar is located.

As shown in FIG. 5, the dimming film 10 also includes several hollow areas 13. In some embodiments, the dimming film 10 includes four hollow areas 13, and each hollow area 13 is arranged in correspondence with a four turning portion 201. The hollow areas 13 may be located between the second area 12 and the turning portion 201, that is, one hollow area 13 may be located between the arc contour line segment 125 and the turning portion 201 corresponding to that hollow area. In some embodiments, the hollow areas 13 may be distributed throughout areas between the second area 12 and the turning portions 201.

Figure 9:
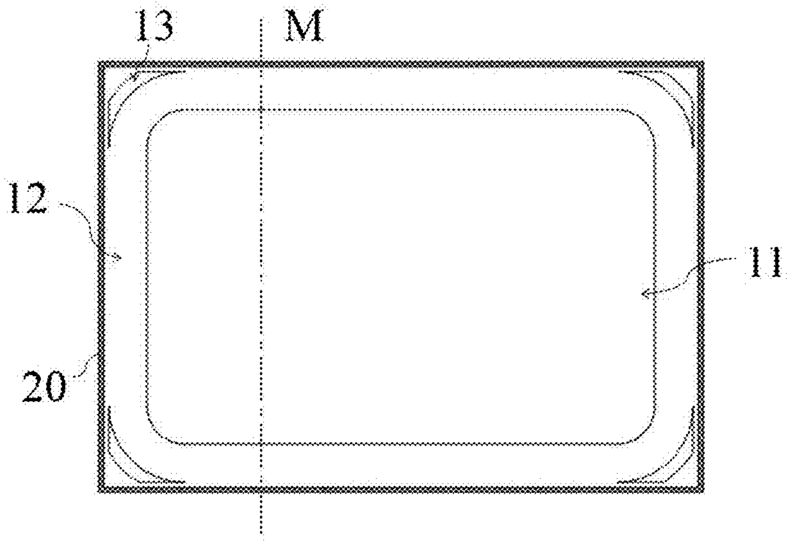
FIG. 9 shows a partial top view of a schematic structural diagram of the dimming device in other embodiments.

As shown in FIG. 9, in other embodiments, the hollow areas 13 may occupy part of the area between the second area 12 and the turning portion 201, and be disposed close to the side of the second area 12.

As shown in FIGS. 4 and 5, taking the first busbar 21 as an example, it can be understood that the first busbar 21 has a certain width along a direction perpendicular to the preset division line M, and the first busbar 21 needs to be undertaken by a film layer structure of corresponding width. In some embodiments, one side of the first busbar 21 away from the preset point O may be flush with the first contour line segment 121 in the second area 12, and two ends of the first busbar 21 may be protruding with respect to the first contour line segment 121 in the second area 12. An end of the arc contour line segment 125 located in the first part **10*a* close to the first contour line segment 121 may be located on the side of the first busbar 21 close to the preset point O. Correspondingly, in the direction perpendicular to the preset division line M, the end of the arc contour line segment 125 may be disconnected and offset from an opposite end of the corresponding first contour line segment 121, and the offset distance may be greater than or is equal to the width of the first busbar 21**.

When preparing the dimming film 10, a rectangular electrochromic film may be provided first. Subsequently, the electrochromic film may be etched or cut at positions corresponding to the hollow areas 13 to remove the film corresponding to the hollow areas 13. It can be understood that each hollow area 13 may be a through-hole disposed on the dimming film 10. By arranging the hollow areas 13, the points furthest from the preset point O on the contour line of the occlusion area in the first part **10*a* and the second part 10*b* may be shifted in a direction closer to the preset point O, so as to shorten the distance $A_1A_2$. Thus, it can be ensured that the dimming film 10** satisfies the inequalities of $A_1A_2 \leq OB_1 - L_1$ and $C_1C_2 \leq OD_1 - L_2$, thereby alleviating the wrinkles on the edge of the dimming apparatus, and also ensuring the convenience of arranging the busbars. In this case, as the busbars are arranged in a straight line, thus the convenience for manufacturing is increased.

As shown in FIG. 6, in some embodiments, the hollow areas 13 may be filled with a support structure 30. It can be understood that after the dimming film 10 is attached between the two glass plates, the hollow areas 13 are filled with the support structures 30, which can avoid partial suspension in each film layer of the dimming apparatus, and all parts of the dimming apparatus can be effectively and reliably supported, thus the chance of damage to the dimming apparatus is reduced. In the meantime, it is also convenient to fit the dimming film 10 between the two glass plates.

It can be understood that the dimming film 10 may include two opposite surfaces. In some embodiments, the support structure 30 may be flush relative to the two surfaces of the dimming film 10.

In other embodiments, the support structure 30 may also be protruded with respect to any surface of the dimming film 10.

In other embodiments, the support structure 30 may also be recessed with respect to any surface of the dimming film 10. When the dimming film 10 is fitted between two glass plates, the recessed position of the support structure 30 with respect to the surface of the dimming film 10 may be supplemented by a corresponding adhesive layer.

In some embodiments, the support structure 30 may also be made of one or more adhesive materials such as an optically clear adhesive, a solid optically clear adhesive, an ionic interlayer film, a liquid optical clear adhesive, polyvinyl butyral, etc.

Figure 10:
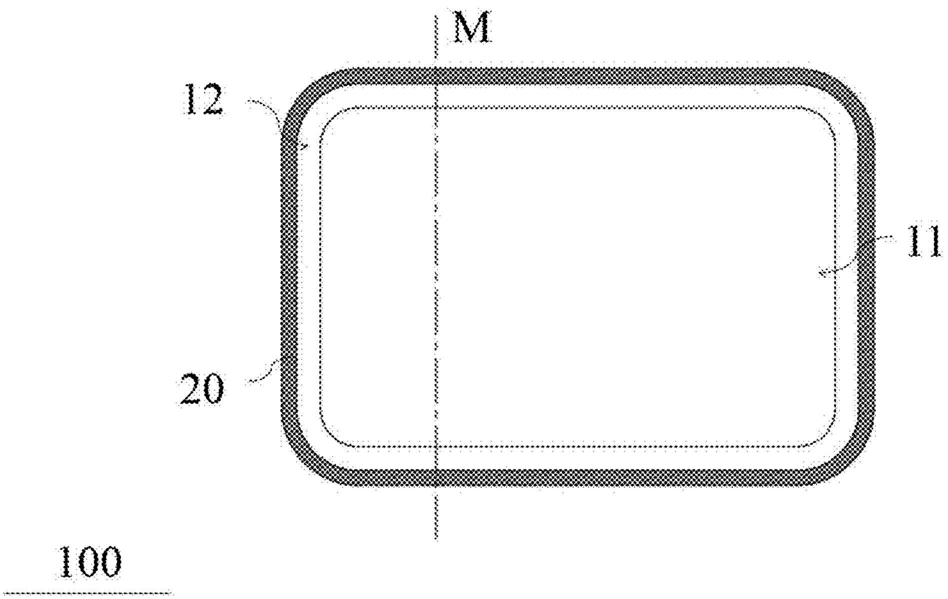
FIG. 10 shows a top view of a schematic structural diagram of the dimming device in other embodiments.

As shown in FIG. 10, in other embodiments, the busbar assembly 20 may also be arranged along the outer contour of the second area 12. Correspondingly, arc-shaped transitions may be made between two adjacent busbars. Correspondingly, the hollow areas 13 are not provided on the dimming film 10.

Figure 11:
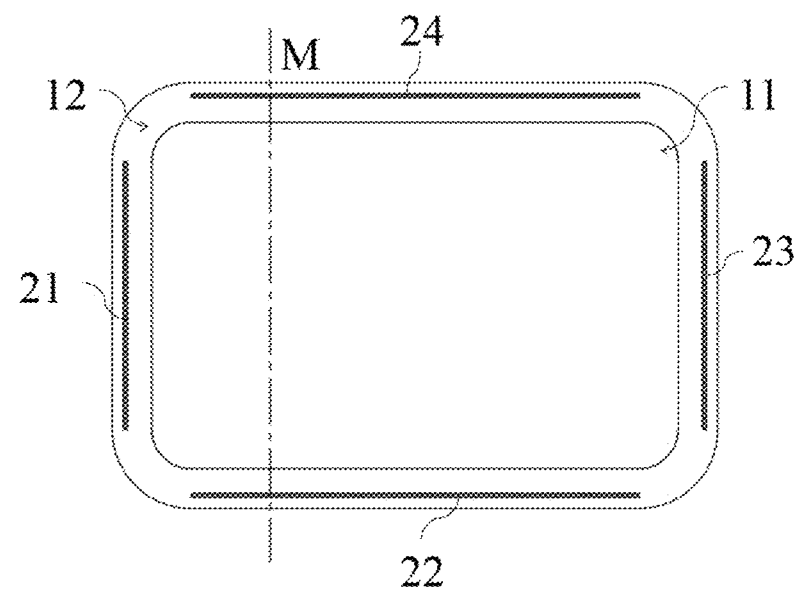
FIG. 11 shows a top view of a schematic structural diagram of the dimming device in some embodiments.

As shown in FIG. 11, in other embodiments, the first busbar 21, the second busbar 22, the third busbar 23 and the fourth busbar 24 may also be separated from each other. The busbar assembly 20 may also be arranged in the second area 12, that is, arranged between the outer contour of the first area 11 and the outer contour of the second area 12, and not in contact with the outer contour of the second area 12. Correspondingly, each busbar may be connected to a lead-out electrode for connection to the power supply, respectively, etc.

In other embodiments, the number of busbars in the busbar assembly 20 may be one, two, three, etc., and each busbar may be in a linear shape. The busbar assembly 20 may be arranged along some sides of a rectangle. Correspondingly, the number of turning portions 201 in the busbar assembly 20 may be one, two, etc. The dimming film 10 may also be provided with the same number of hollow areas 13 as the turning portions 201.

Figure 12:
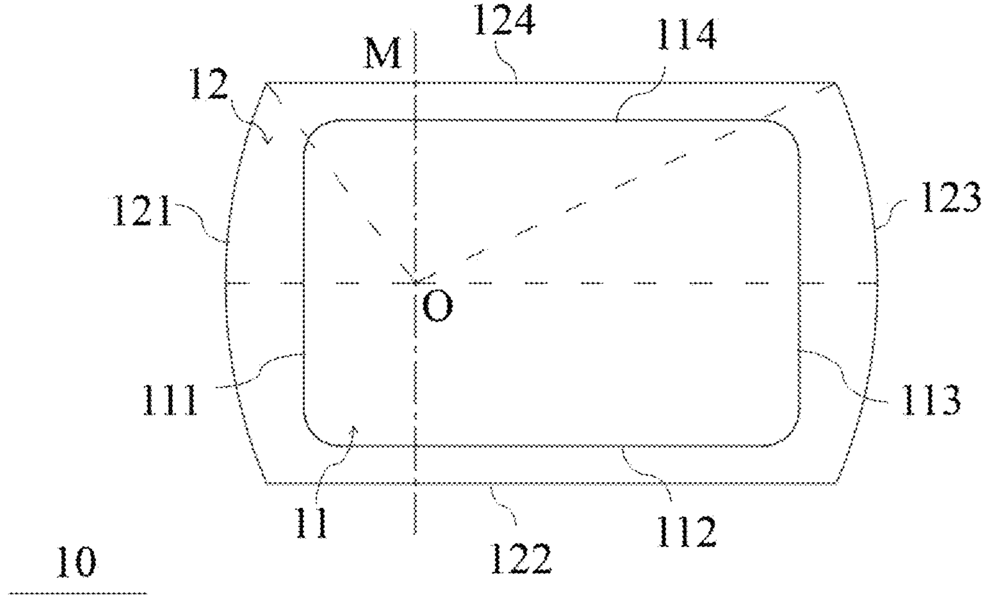
FIG. 12 shows a top view of a schematic structural diagram of the dimming film in another embodiment.

As shown in FIG. 12, the differences of this embodiment from the embodiments as above-discussed are that:

With reference to FIG. 4, the first contour line segment 121 and the third contour line segment 123 are both arc segments. Particularly, the position of the first contour line segment 121 close to point $B_1$ is curved and convex in a direction away from the first contour portion 111. The position of the third contour line segment 123 close to $D_1$ is curved and convex in a direction away from the third contour portion 113. Therefore, the length of line segment $B_1B_2$ and the length of line segment $D_1D_2$ can be extended to satisfy the inequalities of $A_1A_2 \leq OB_1 - L_1$ and $C_1C_2 \leq OD_1 - L_2$.

In the embodiments, two ends of the first contour line segment 121 may be directly connected to the corresponding ends of the second contour line segment 122 and the fourth contour line segment 124, respectively. Two ends of the third contour line segment 123 may also be directly connected to the corresponding ends of the second contour line segment 122 and the fourth contour line segment 124, respectively.

Figure 13:
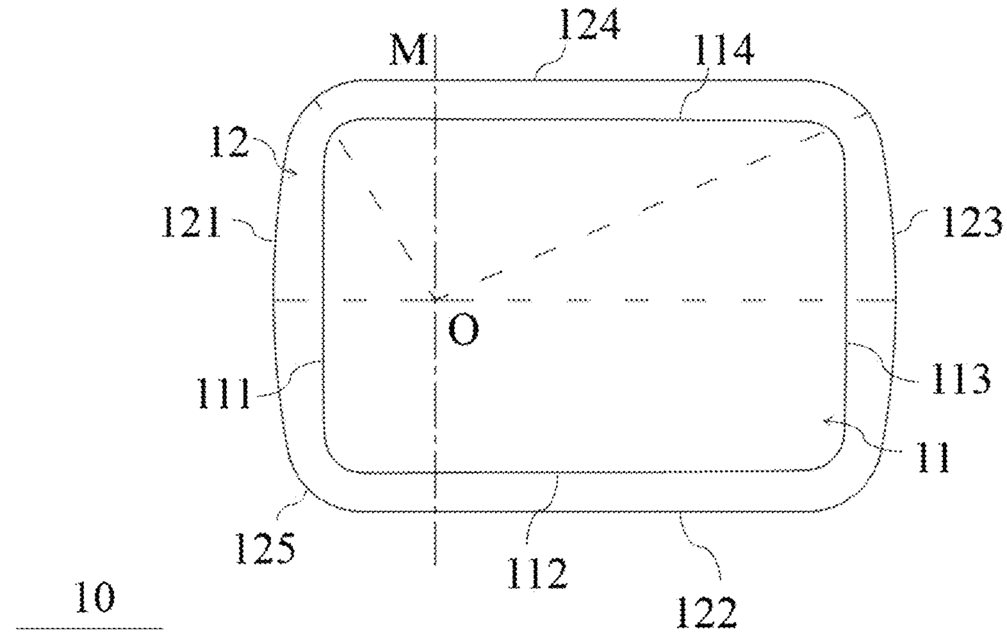
FIG. 13 shows a top view of a schematic structural diagram of the dimming film in a further embodiment.

As shown in FIG. 13, the difference of this embodiment from the embodiment shown in FIG. 12 is that any two adjacent contour line segments may be connected by an arc contour line segment 125. The arc contour line segment 125 is curved and convex in a direction away from the preset point O.

In some embodiments, the visual area of the dimming device 100 may be provided with a groove structure approaching the preset point O according to the needs of the dimming apparatus in the vehicle.

Figure 14:
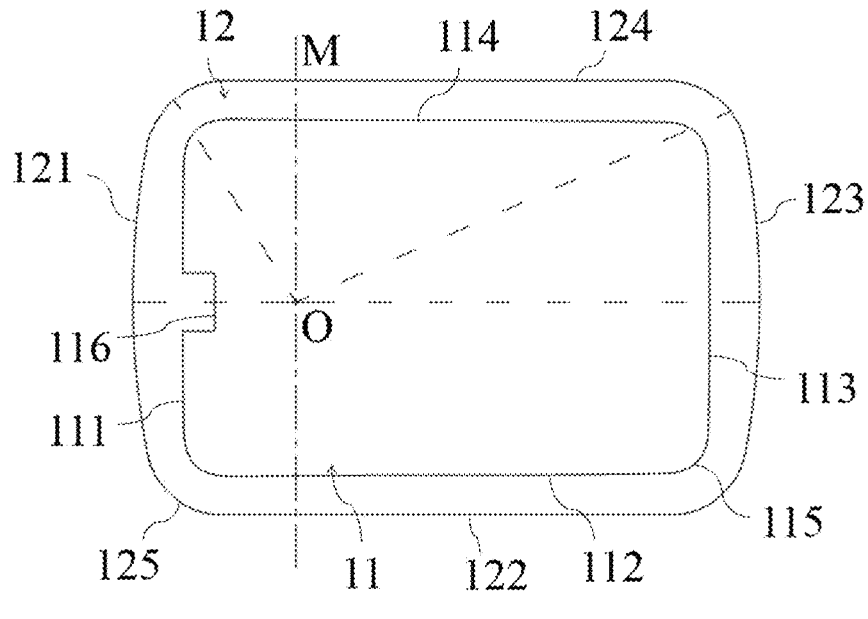
FIG. 14 shows a top view of a schematic structural diagram of the dimming film in yet another embodiment.

As shown in FIG. 14, in this embodiment, the outer contour of the first area 11 also includes a special-shaped contour portion 116, and the special-shaped contour portion 116 may be provided on the first contour portion 111, the second contour portion 112, the third contour portion 113 or the fourth contour portion 114.

In some embodiments, the special-shaped contour portion 116 may be disposed at the first contour portion 111. It can be understood that along the extending direction of the first contour portion 111, the special-shaped contour portion 116 may be disposed at the middle or any end of the first contour portion 111 as needed. In this embodiment, the special-shaped contour portion 116 may be in the shape of a groove approaching the preset point O direction.

In this embodiment, the outer contour of the second area 12 may be arranged according to the method provided in any of the above embodiments.

In the description of this specification, reference to the terms "one embodiment," "some embodiments," "an example," "specific examples," or "some examples" or the like means that specific features, structures, materials or characteristics are described in connection with the embodiment or example are included in at least one embodiment or example of the present application. In this specification, the schematic expressions of the above terms are not necessarily directed to the same embodiment or example. Furthermore, the specific features, structures, materials or characteristics described may be combined in any suitable manner in any one or more embodiments or examples. Furthermore, without contradicting each other, persons skilled in the art may combine different embodiments or examples and combine features of different embodiments or examples described in this specification.

Although the embodiments of the present application have been shown and described as above, it can be understood that the above-mentioned embodiments are illustrative and should not be understood as limitations to the present application. For persons of ordinary skill in the art, the above-mentioned embodiments may have changes, modifications, substitutions and variations within the scope of the present application.

The invention claimed is:

1. A dimming device, comprising:

a dimming film, comprising a first area and a second area, the second area being arranged surrounding a circumference of the first area;

wherein the dimming film comprises a preset point O and a preset division line M, the preset division line M divides the dimming film into a first part and a second part, and the preset point O is located on the preset division line M;

the first part satisfies an inequality of $A_1A_2 \leq OB_1 - L_1$;

wherein $A_1$ represents a point on an outer contour of the second area that is farthest from the preset point O in the first part, $A_2$ represents an intersection point formed by a line segment $OA_1$ intersected with an outer contour of the first area, $B_1$ represents a point on the outer contour of the second area that is closest to the preset point O in the first part, and $L_1$ represents a maximum vertical distance between the outer contour of the first area and the preset division line M in the first part;

the second part satisfies an inequality of $C_1C_2 \leq OD_1 - L_2$;

wherein $C_1$ represents a point on the outer contour of the second area that is farthest from the preset point O in the second part, $C_2$ represents an intersection point formed by a line segment $OC_1$ intersected with the outer contour of the first area, $D_1$ represents a point on the outer contour of the second area that is closest to the preset point O in the second part, and $L_2$ represents a maximum vertical distance between the outer contour of the first area and the preset division line M in the second part.

2. The dimming device according to claim 1, wherein the outer contour of the first area comprises a first contour portion, a second contour portion, a third contour portion and a fourth contour portion arranged sequentially around a quadrilateral circumference, the first contour portion and the third contour portion are provided in the first part and the second part respectively, the second contour portion and the fourth contour portion are both extended from the first part to the second part;

the outer contour of the second area comprises a first contour line segment, a second contour line segment, a third contour line segment and a fourth contour line segment surrounding sequentially in a circumferential direction of the second area, the first contour line segment is opposite to the first contour portion, and the third contour line segment is opposite to the third contour portion.

3. The dimming device according to claim 2, wherein the first contour line segment is parallel to the first contour portion, and the third contour line segment is parallel to the third contour portion;

an arc contour line segment is provided between any two adjacent contour line segments among the first contour line segment, the second contour line segment, the third contour line segment and the fourth contour line segment.

4. The dimming device according to claim 2, wherein the first contour line segment is curved and convex in a direction away from the first contour portion, and the third contour line segment is curved and convex in a direction away from the third contour portion.

5. The dimming device according to claim 4, wherein any two adjacent contour line segments among the first contour line segment, the second contour line segment, the third contour line segment and the fourth contour line segment are directly connected with each other.

6. The dimming device according to claim 4, wherein any two adjacent contour line segments among the first contour line segment, the second contour line segment, the third contour line segment and the fourth contour line segment are connected with an arc contour line segment.

7. The dimming device according to claim 3, wherein the outer contour of the first area further comprises a special-shaped contour portion, and the special-shaped contour portion is provided on the first contour portion, the second contour portion, the third contour portion or the fourth contour portion.

8. The dimming device according to claim 1, wherein the dimming device further comprises a busbar assembly, and the busbar assembly is arranged at a circumferential edge of the dimming film, and is located on a side of the outer contour of the first area away from the preset point O;

the busbar assembly is arranged along at least a portion of a quadrilateral.

9. The dimming device according to claim 8, wherein the busbar assembly is arranged in one piece.

10. The dimming device according to claim 9, wherein the busbar assembly is arranged on a side of the second area away from the first area, and the busbar assembly comprises a plurality of turning portions, the plurality of turning portions are protruded with respect to the second area;

the dimming film further comprises a plurality of hollow areas, each hollow area is arranged in correspondence with a turning portion, and the plurality of hollow areas are located on a side of the second area away from the first area to enable the first part to satisfy the inequality of $A_1A_2 \leq OB_1 - L_1$ and enable the second part to satisfy the inequality of $C_1C_2 \leq OD_1 - L_2$.

11. The dimming device according to claim 10, wherein the plurality of hollow areas are distributed throughout areas between the second area and the turning portions corresponding to the plurality of hollow areas.

12. The dimming device according to claim 10, wherein each of the plurality of hollow areas is filled with a support structure.

13. A dimming apparatus, comprising:

a dimming device, comprising:

a dimming film, comprising a first area and a second area, the second area being arranged surrounding a circumference of the first area;

wherein the dimming film comprises a preset point O and a preset division line M, the preset division line M divides the dimming film into a first part and a second part, and the preset point O is located on the preset division line M;

the first part satisfies an inequality of $A_1A_2 \leq OB_1 - L_1$;

wherein $A_1$ represents a point on an outer contour of the second area that is farthest from the preset point O in the first part, $A_2$ represents an intersection point formed by a line segment $OA_1$ intersected with an outer contour of the first area, $B_1$ represents a point on the outer contour of the second area that is closest to the preset point O in the first part, and $L_1$ represents a maximum vertical distance between the outer contour of the first area and the preset division line M in the first part;

the second part satisfies an inequality of $C_1C_2 \leq OD_1 - L_2$;

wherein $C_1$ represents a point on the outer contour of the second area that is farthest from the preset point O in the second part, $C_2$ represents an intersection point formed by a line segment $OC_1$ intersected with the outer contour of the first area, $D_1$ represents a point on the outer contour of the second area that is closest to the preset point O in the second part, and $L_2$ represents a maximum vertical distance between the outer contour of the first area and the preset division line M in the second part.

14. The dimming apparatus according to claim 13, wherein the outer contour of the first area comprises a first contour portion, a second contour portion, a third contour portion and a fourth contour portion arranged sequentially around a quadrilateral circumference, the first contour portion and the third contour portion are provided in the first part and the second part respectively, the second contour portion and the fourth contour portion are both extended from the first part to the second part;

the outer contour of the second area comprises a first contour line segment, a second contour line segment, a third contour line segment and a fourth contour line segment surrounding sequentially in a circumferential direction of the second area, the first contour line segment is opposite to the first contour portion, and the third contour line segment is opposite to the third contour portion.

15. The dimming apparatus according to claim 14, wherein the first contour line segment is parallel to the first contour portion, and the third contour line segment is parallel to the third contour portion;

an arc contour line segment is provided between any two adjacent contour line segments among the first contour line segment, the second contour line segment, the third contour line segment and the fourth contour line segment.

16. The dimming apparatus according to claim 14, wherein the first contour line segment is curved and convex in a direction away from the first contour portion, and the third contour line segment is curved and convex in a direction away from the third contour portion.

17. The dimming apparatus according to claim 13, wherein the dimming device further comprises a busbar assembly, and the busbar assembly is arranged at a circumferential edge of the dimming film, and is located on a side of the outer contour of the first area away from the preset point O;

the busbar assembly is arranged along at least a portion of a quadrilateral.

18. The dimming apparatus according to claim 17, wherein the busbar assembly is arranged in one piece.

19. The dimming apparatus according to claim 18, wherein the busbar assembly is arranged on a side of the second area away from the first area, and the busbar assembly comprises a plurality of turning portions, the plurality of turning portions are protruded with respect to the second area;

the dimming film further comprises a plurality of hollow areas, each hollow area is arranged in correspondence with a turning portion, and the plurality of hollow areas are located on a side of the second area away from the first area to enable the first part to satisfy the inequality of $A_1A_2 \leq OB_1 - L_1$ and enable the second part to satisfy the inequality of $C_1C_2 \leq OD_1 - L_2$.

20. The dimming apparatus according to claim 19, wherein the plurality of hollow areas are distributed throughout areas between the second area and the turning portions corresponding to the plurality of hollow areas.

* * * * *